W. ROEMER.

STAPLES FOR SATCHELS, CARPET-BAGS, &c.

No. 6,939. Reissued Feb. 22, 1876.

Witnesses:

D. Rousseau

A. v. Briesen

Inventor:

Wm. Roemer by his attorney

A. v. Briesen

N. PETERS, PHOTO-LITHOGRAPHER, WASHINGTON, D. C.

UNITED STATES PATENT OFFICE.

WILLIAM ROEMER, OF NEWARK, NEW JERSEY.

IMPROVEMENT IN STAPLES FOR SATCHELS, CARPET-BAGS, &c.

Specification forming part of Letters Patent No. 124,449, dated March 12, 1872; reissue No. 6,939, dated February 22, 1876; application filed January 27, 1876.

*To all whom it may concern:*

Be it known that I, WILLIAM ROEMER, of Newark, county of Essex and State of New Jersey, have invented Improvements in Staples for Articles such as Satchels, Carpet-Bags, Valises, &c., of which the following is a specification:

This invention relates to an improved device for fastening the ends of handles to the frames or bars of such articles as satchels, carpet-bags, valises, &c.

The invention consists in providing such device or staple, at or near each end, with a projecting flange or shoulder, so that the end of the handle will be confined between two such flanges or shoulders, as hereinafter more fully described.

Figure 1:
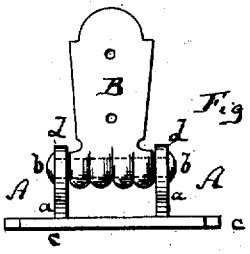
Figure 2:
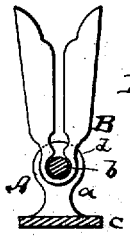
Figure 3:
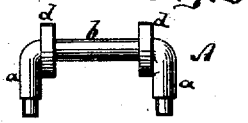

In the accompanying drawing, Figure 1 represents a side view of my improved staple or fastener, showing the same connected to the end of a handle or handle-cap. Fig. 2 is a cross-section of the same, and Fig. 3 a side view of a modification thereof.

Similar letters of reference indicate corresponding parts in all the figures.

The letter A represents my improved fastener or staple, made of metal or other suitable material. I will term this fastener A a staple in the following description: The staple A is composed of two uprights or ears, *a a*, which are connected, at or near their upper ends, by a horizontal bar, *b*, as shown. These uprights *a a* are, at their lower ends, to be fastened to the upper bar or frame of the valise, satchel, carpet-bag, &c., by means of screws or rivets passing through the base *c* of the staple, (shown in Fig. 1,) or by attaching the lower ends of the uprights *a* (shown in Fig. 3) to such frame or bar. The horizontal bar *b* of the staple serves to hold the end of the handle or handle-cap B, which embraces said bar, as shown. In order to properly confine the handle or handle-cap to the horizontal bar *b* of the staple, I provide the staple A, at or near each end of the bar *b*, with a shoulder or flange, *d*, which is formed either, as in Fig. 1, by extending the uprights *a* in height or width, or, as in Fig. 3, by applying the flanges, by casting or otherwise, to the bar *b*, or to the uprights *a*.

I do not claim to have invented a staple composed of two uprights and a horizontal connecting-bar; but I do claim—

1. As a new article of manufacture, the flanged staple A, composed of the uprights *a a*, horizontal connecting-bar *b*, and shoulders or flanges *d d*, substantially as specified.

2. In combination with the handle or handle-cap B, the flanged staple A, constructed substantially as set forth.

WILLIAM ROEMER.

Witnesses:

A. V. BRIESEN,

ERNEST C. WEBB.